May 6, 1941.   P. SCHLUMBOHM   2,241,368
FILTERING DEVICE
Filed April 13, 1939   2 Sheets-Sheet 1

INVENTOR

May 6, 1941.　　　P. SCHLUMBOHM　　　2,241,368
FILTERING DEVICE
Filed April 13, 1939　　2 Sheets—Sheet 2

INVENTOR

Patented May 6, 1941

2,241,368

UNITED STATES PATENT OFFICE 2,241,368

FILTERING DEVICE

Peter Schlumbohm, New York, N. Y., assignor of one-half to Isaac Harter, Akron, Ohio Application April 13, 1939, Serial No. 267,561
In Germany April 13, 1938

12 Claims. (Cl. 210—160)

This invention relates to a filtering device and more particularly to a coffee maker and tea maker. Though the filtering device to be described may be used with facility in the making of coffee and tea, it is not limited to such use and may be generally used in the laboratory to effect filtering processes.

The filtering device is a combination of a filter funnel adapted to hold a paper filter and a bottle-like flask adapted to receive filtrate. These two elements are formed integral with each other or are joined to form a single element.

In the development of the device it was found that the mere combination of a funnel with a pot or flask for the filtrate did not effect the results desired for such a combination was inoperative unless means were provided to permit the escape of air from the pot or flask as the air is displaced by the filtrate. This finding was unexpected for the necessity for the air passage was created by the simple joining of the filter funnel to the filtrate flask. In prior practice, when an ordinary filter funnel is associated with a filter flask, even in those cases in which the filtrate flask has a widened neck to support the separate filter funnel, as a practical matter there was sufficient leakage between the filter funnel and the neck of the filtrate flask to allow the displaced air to escape.

It is an object of the instant invention to provide a one piece filtering device of simple construction which may be readily cleaned and used with facility.

It is another object of the instant invention to provide an integral filtering device which will allow the displacement of air by the filtrate.

Other objects and the nature and advantages of the invention will be apparent from the following description taken in conjunction with the accompanying drawings, wherein.

Figure 1:
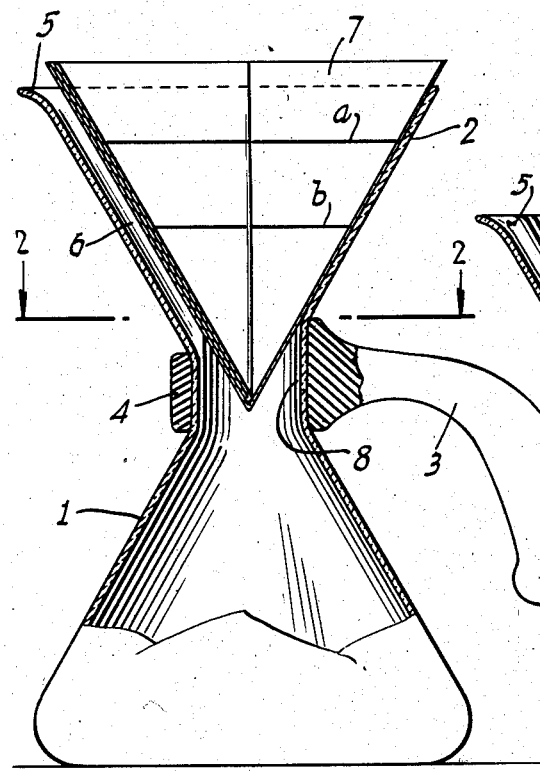
Fig. 1 is a vertical sectional view with parts shown in elevation of a preferred form of the invention.

Referring to the drawings, coffee may be made by inserting the filter paper 7 in the funnel 2 of the filtering device, ground coffee is then deposited in the bottom of the filter paper 7 to the height corresponding to the levels $a$ or $b$, and boiling water is poured into the filter paper over the ground coffee. After the ground coffee has been extracted by the hot water the filter paper 7 which holds the spent coffee grounds is taken out of the funnel 2 by simply gripping the rim of the paper at opposite sides with both hands, lifting the same from the funnel whereupon it may be disposed of in the ordinary garbage receptacle. This is a great convenience to the housewife, who in the past has been accustomed to untidily disposing the grounds in the kitchen sink when cleaning her coffee maker. The filtered coffee extract can then be poured from the bottom flask 1 into the usual coffee cups, and the deep groove 6 cooperating with the lip 5 conveniently serves as a pouring spout as well as an air passage for the air displaced by the filtrate.

Figure 3:
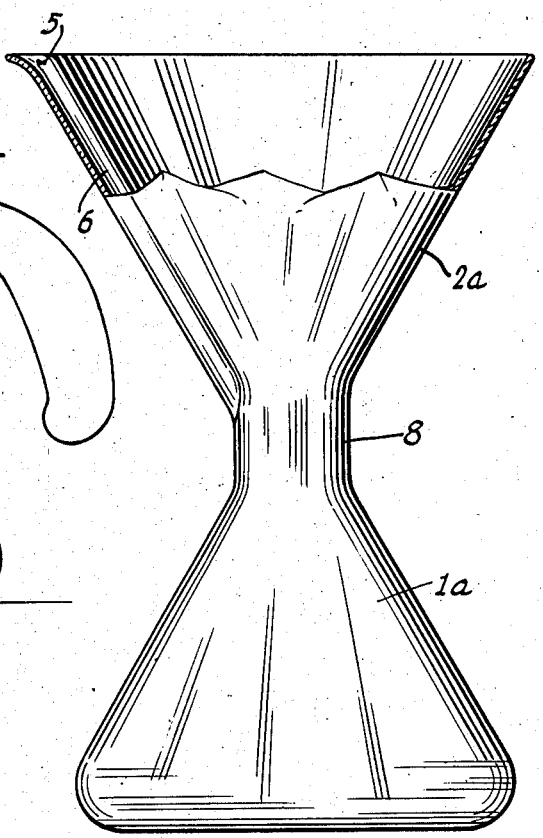
Fig. 3 is an elevational view of a modified form of device similar to Fig. 1 with parts removed and parts shown in section.
Figure 2:
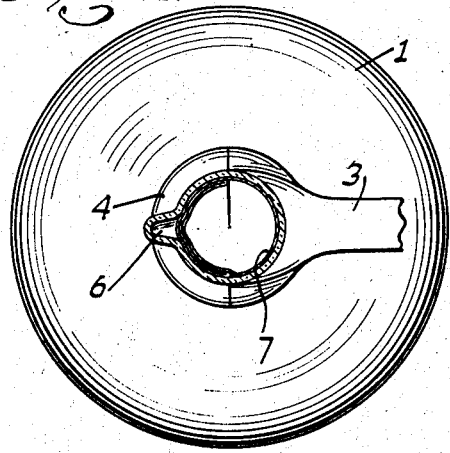
Fig. 2 is a horizontal sectional view taken along line 2—2 of Fig. 1, and looking in the direction of the arrows.
Figure 4:
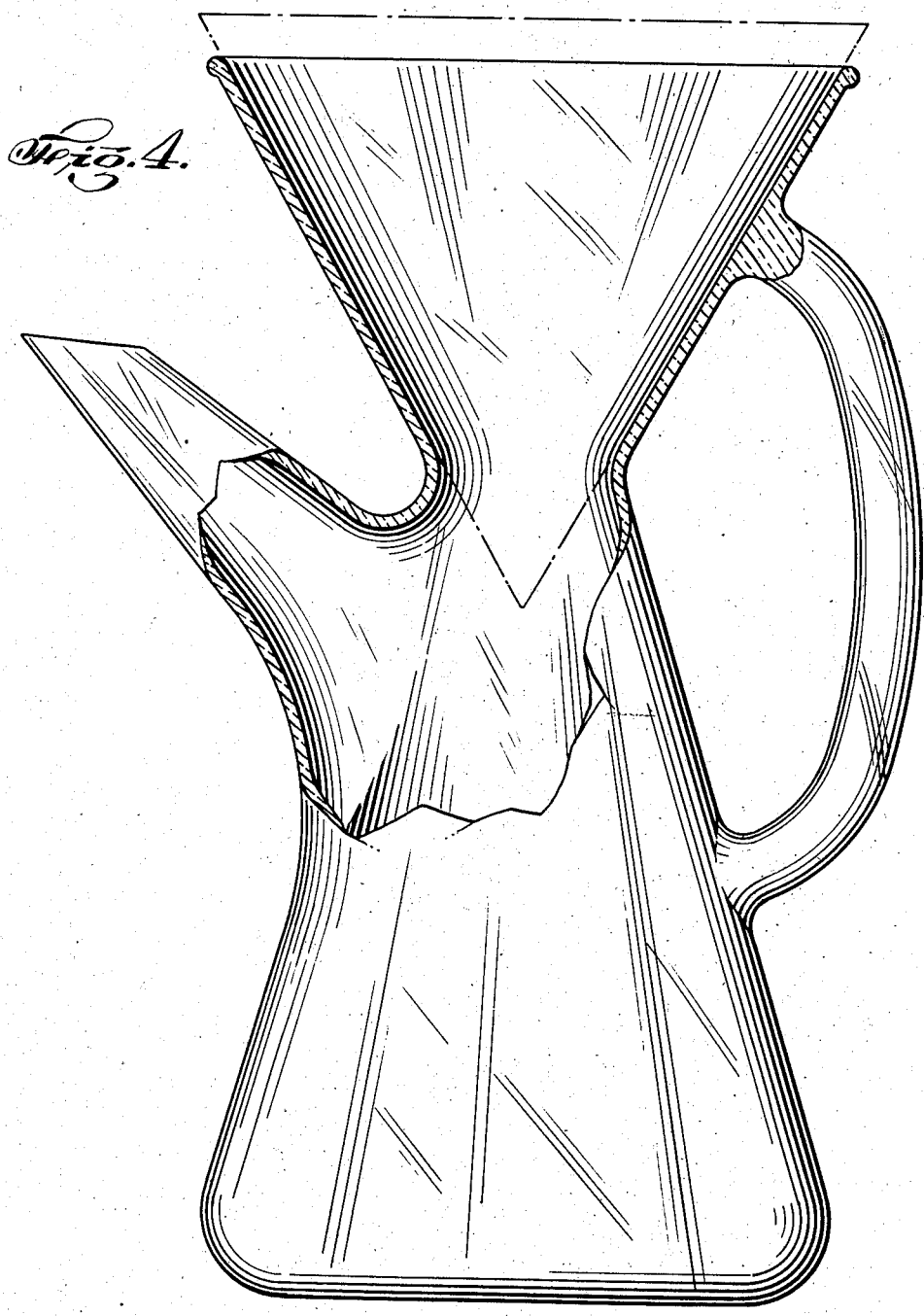
Fig. 4 is an elevational view of a second embodiment of the invention with parts broken away.

The handle of the filtering device, especially when the same is used for hot beverages, is facilitated by the handle 3 shown in Fig. 1 and the handle shown in Fig. 4. If the handle is a separate element as shown in Fig. 1, it is practical to provide a cylindrical part 8 between the funnel 2 and the filtrate flask 1. As shown in Figs. 1 and 2, the portion 4 of the handle 3 has a good hold on the cylindrical portion 8 of the filtering device. The filtrate flask 1 is preferably constructed in the well known shape of an Erlemeyer flask, as illustrated in Fig. 1, Fig. 2, and Fig. 3. Not only does this construction effect a very stable filtering device, but it also greatly facilitates pouring and the utilization of the groove 6 for this purpose. In addition, this construction facilitates cleaning by avoiding corners and portions which cannot be reached with a cleaning brush introduced through the funnel 2. It will be appreciated that this last advantage is of great importance for cleanliness is of primary significance in all filtering operations.

The embodiment illustrated in Fig. 3 differs from the embodiment illustrated in Fig. 1, by the relative volumetric proportions between the funnel $2a$ and the filtrate flask $1a$. In Fig. 3 the volume of the funnel is equal to the volume of the flask so that for the making of a predetermined volume of coffee corresponding to the volume of the flask $1a$, only one operation of pouring boiling water in the filter in the funnel $2a$ is required. While this construction effects a saving of time, in some filtering operations better results are obtained if the funnel is filled up several times with fresh boiling water whereby a longer interval of time for the filtering operation is effected and a more efficient extraction results. In such cases the device illustrated in Fig. 1 may be better utilized.

With the model illustrated in Fig. 4, the pouring of the filtrate is effected through the spout shown in a more conventional manner, and the handle for the filtering device in this embodiment of the invention is similarly more conventional. Though the construction of the device illustrated in Fig. 4 differs somewhat from the construction of the device illustrated in Figs. 1 and 3 inclusive, the principles involved are substantially the same, for this filtering device is integral in construction and provides air passage means for the displacement of air by the filtrate.

In the constructions illustrated in Figs. 1 to 4 inclusive, the funnel and filter flask portions of the devices are generally conical in shape with the axes of the two cones of each device in vertical alignment and with the apexes of the two cones adjacent each other. The opening between the funnel element and the filtrate flask element is relatively large to facilitate cleaning and the interior side walls of the respective cones approach alignment with each other.

It will be obvious to those skilled in the art that various changes may be made in this device without departing from the spirit of the invention and therefore the invention is not limited to what is shown in the drawings and described in the specification but only as indicated in the appended claims.

I claim:

1. A device for filtering liquids under hydrostatic pressure through a paper filter cone, comprising a vessel including a generally conical bottom compartment communicating with a generally conical top compartment, said two compartments being integral with each other with their small ends adjacent each other and the axes of said compartments in substantially vertical alignment, the opening between said two compartments being large enough to permit passage therethrough of a cleaning instrument, the wall of said top compartment having an inside groove extending from the top thereof to the bottom thereof so as to maintain communication between the bottom compartment and the atmosphere to permit the escape of air displaced by filtrate falling into the bottom compartment, said groove also functioning as a pouring spout when the device is tilted, the walls of said bottom compartment adjacent the said opening between the two compartments extending regularly outwardly and downwardly.

2. A device for filtering liquids under their hydrostatic pressure through a paper filtering element, comprising a vessel including a bottom compartment for receiving filtrate and a top compartment for receiving said filtering element, said vessel having an air passage connecting said bottom compartment with the atmosphere at a level above the lower portion of said top compartment, said air passage serving as an outlet for air from said bottom compartment as it is displaced by filtrate, the interior of said top compartment being generally conical in shape and in communicating relation with said bottom compartment by an opening large enough to permit the passage of a cleaning instrument therethrough, said two compartments being integral with each other and with the small end f said top compartment adjacent the bottom compartment, said compartments having their axes in substantial alignment whereby the vessel may be readily cleaned by the insertion of a cleaning brush or similar instrument, the side walls of the upper compartment extending in an upward direction for a sufficiently large dimension so as to be capable of supporting said filtering element extending well into the relatively large opening, the walls of said bottom compartment adjacent the said opening between the two compartments extending regularly outwardly and downwardly.

3. A device as claimed in claim 2 in which the air outlet passage is formed by an inside groove in the wall of said top compartment extending from the top thereof to the bottom thereof so as to maintain communication between the bottom compartment and the atmosphere.

4. A device as claimed in claim 2 in which the side walls of the top compartment diverge upward at an angle of sixty degrees to each other in a vertical plane passing through the axis thereof, whereby a sixty degree filter cone will be strongly supported by said side walls and the load at the apex of the filter cone will be effectively transmitted to said side walls.

5. A device as claimed in claim 2 in which the bottom compartment is of generally conical shape, and in which the top compartment communicates with the bottom compartment through a generally cylindrical neck of generally large diameter to facilitate the passage of a cleaning instrument therethrough, said cylindrical neck being relatively short so as not to prevent the reaching of the interior of the side walls of the bottom compartment by a cleaning instrument passed through the top compartment and said neck.

6. A filtering device, comprising a vessel having an upper part for receiving and supporting a paper filter sheet folded to form a 60° cone and a lower part for receiving the filtrate, said two parts being integral with each other, and the upper part being of inverted 60° frusto-conical shape and having a regular inner surface with an air outlet groove extending from the top to the bottom thereof and being open at the top and being connected with the otherwise closed top of the lower part by a neck having an opening of sufficiently large size to permit ready introduction of a cleaning instrument into the lower part whereby the interior of same will be accessible to said instrument and so that a portion of a filter cone positioned in the upper part will extend into the neck opening free from wall contact, the walls of said bottom part adjacent the said opening between the two parts extending regularly outwardly and downwardly.

7. A filtering device, comprising a vessel having an upper part for receiving and supporting a paper filter cone and a lower part for receiving the filtrate, said two parts being integral with each other, and the upper part being of inverted frusto-conical shape and being open at the top and being connected with the otherwise closed top of the lower part by a neck having an opening of sufficiently large size to permit ready introduction of a cleaning instrument into the lower part whereby the interior of same will be accessible to said instrument and so that a portion of said filter cone positioned in the upper part will extend into the neck opening free from wall contact, and the upper part having a regular inner surface with an air outlet groove extending from the top to the bottom thereof, the side walls of the upper part extending in an upward direction for a sufficiently large dimension so as to be capable of supporting said filter cone with its apex extending well into the large opening in said neck, the walls of said bottom part adjacent the said opening between the two parts extending regularly outwardly and downwardly.

8. A filtering device comprising a vessel having an upper part for receiving a paper filter and a lower part for receiving filtrate, said two parts being integral with each other, and the upper part being of inverted frusto-conical shape and being open at the top and being connected with the otherwise closed top of the lower part by a neck having an opening of sufficiently large size to permit ready introduction of a cleaning instrument into the lower part whereby the interior of same will be accessible to said instrument, a conical filter paper positioned within said upper part with the apex at the bottom of said filter extending well into said neck and toward said lower part, in order that atmosphere displaced by filtrate may pass upwardly and out of said vessel, the side walls of the upper part extending in an upward direction for a sufficiently large dimension so as to be capable of supporting said filter with its apex extending into the relatively large opening in said neck, the walls of said bottom part adjacent the said opening between the two parts extending regularly outwardly and downwardly.

9. A conical filter funnel and a filtrate flask forming an air-tight container open only at the top of the funnel, in which the restriction at the bottom of the funnel is wide enough to allow passage of downward flow of filtrate and simultaneously therewith upward flow of escaping gas as well as permitting the introduction of a cleaning instrument therethrough to effect cleaning of the filtrate flask, the side walls of said funnel extending in an upward direction for a sufficiently large dimension so as to be capable of supporting a paper filter extending well into the wide restriction at the bottom of the funnel, the walls of said filtrate flask adjacent the said opening between the funnel and the flask extending regularly outwardly and downwardly.

10. A filtering and dispensing device comprising a filter funnel adapted to receive a paper filter cone, a filtrate flask joined at its neck to the bottom of said funnel, and an upwardly directed pouring channel for dispensing the filtrate by tilting the device, said channel extending downward at least as far as the bottom of said funnel so that it may serve as an escape passage for displaced atmosphere during filtration, the funnel having a relatively large bottom opening to permit the passage therethrough of a cleaning instrument, the side walls of said funnel extending in an upward direction for a sufficiently large dimension so as to be capable of supporting said filter extending well into the relatively large opening, the walls of said bottom flask adjacent the said opening between the two flasks extending regularly outwardly and downwardly.

11. A filtering and dispensing device as in claim 10, said pouring channel being formed by an upwardly extending groove in the wall of the filter funnel.

12. A filtering and dispensing device as in claim 10, said pouring channel being formed by a spout extending upwardly from the wall of the filtrate flask.

PETER SCHLUMBOHM.